(No Model.) 4 Sheets—Sheet 1.
A. H. MASON.
EASEL FOR THE USE OF CHINA DECORATORS.
No. 429,858. Patented June 10, 1890.
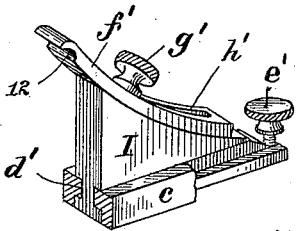
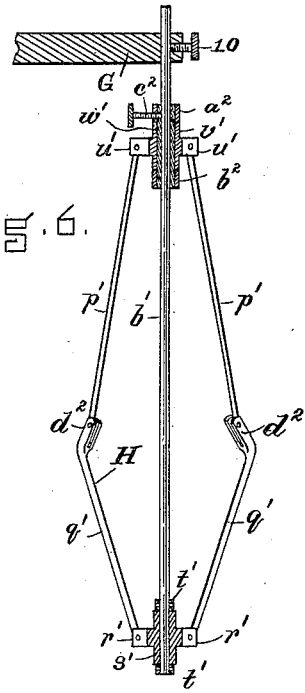
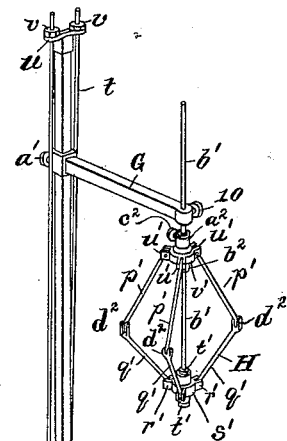
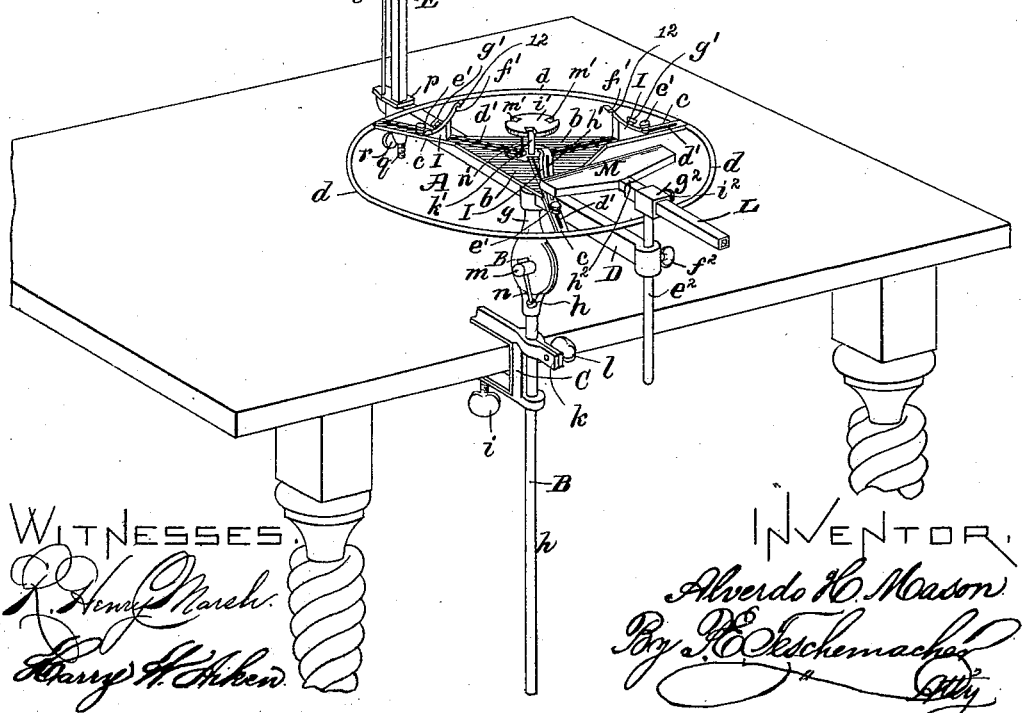
WITNESSES
INVENTOR
Alverdo H. Mason

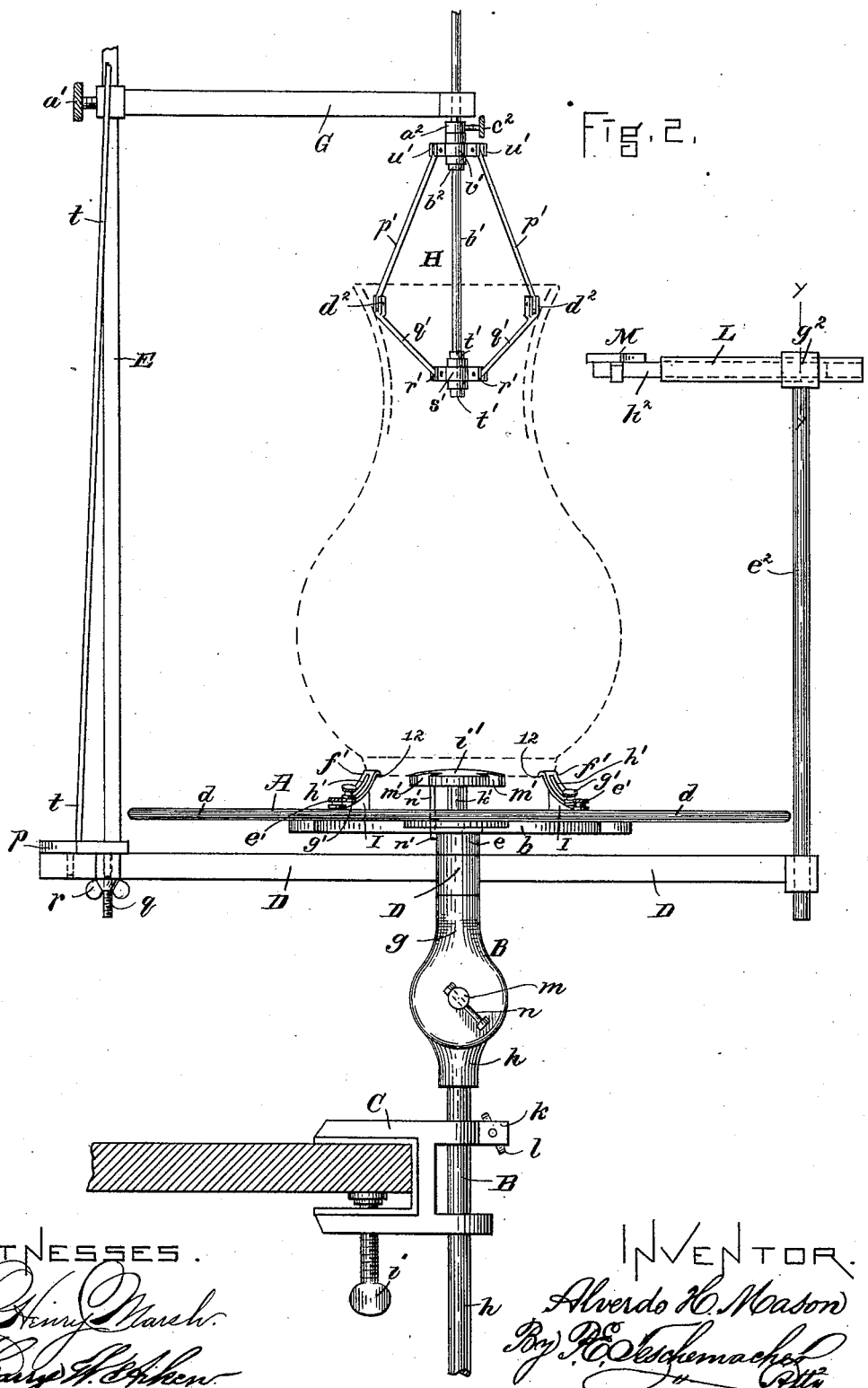

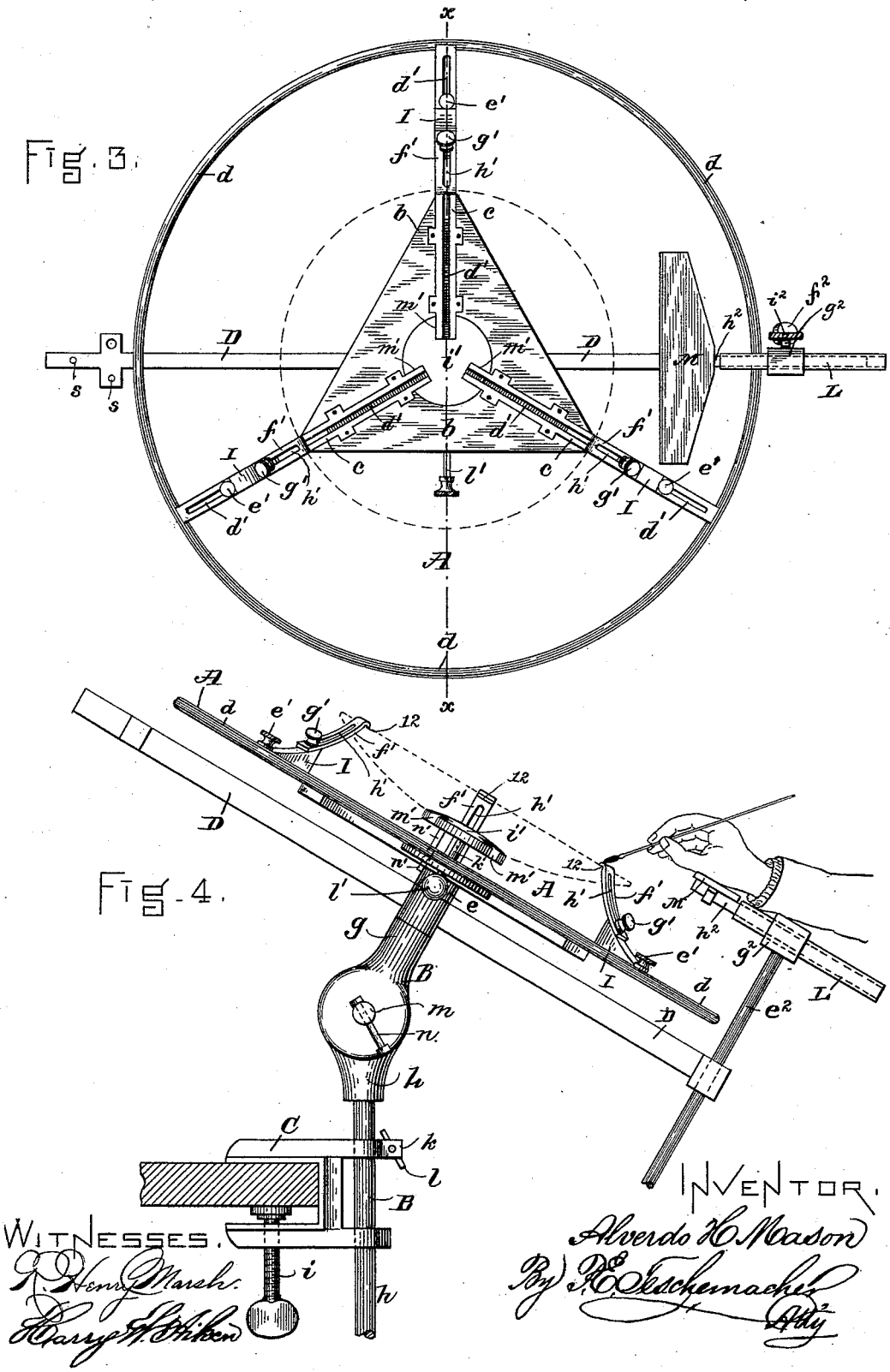

(No Model.) 4 Sheets—Sheet 4.
A. H. MASON.
EASEL FOR THE USE OF CHINA DECORATORS.
No. 429,858. Patented June 10, 1890.
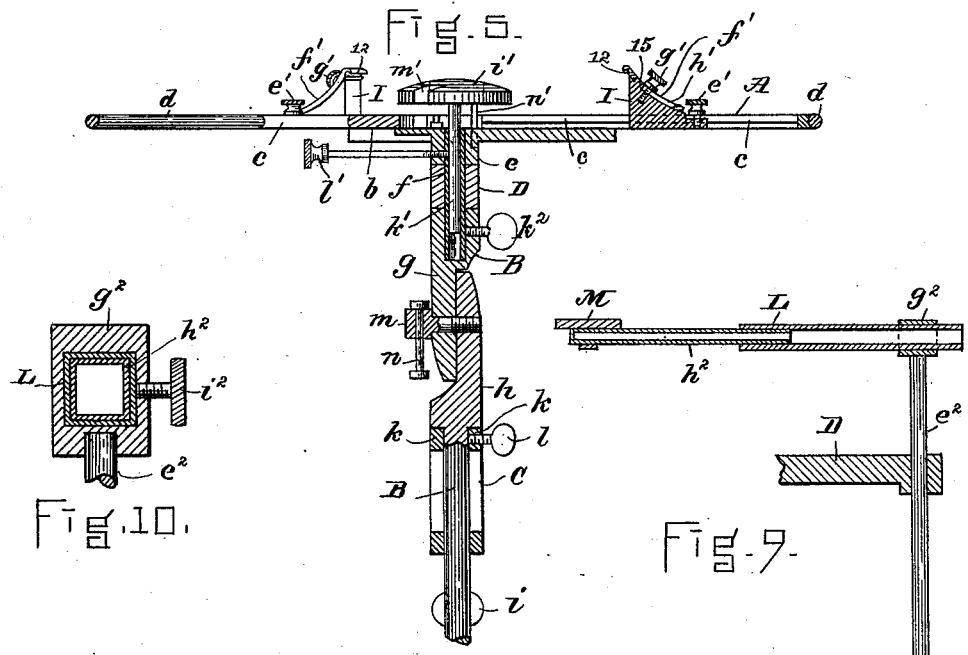
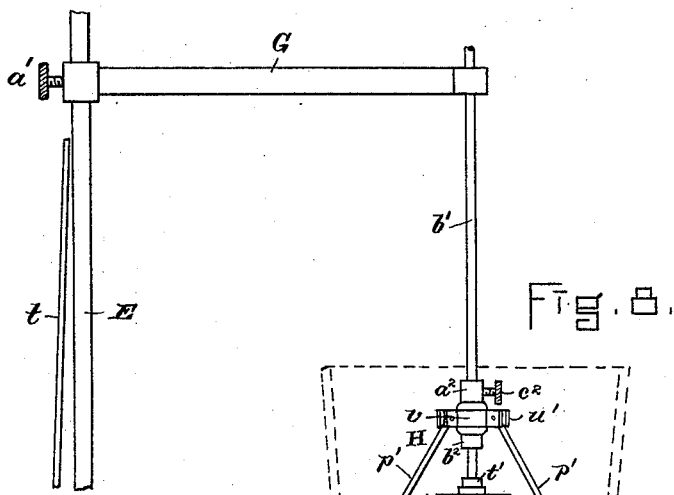
WITNESSES.
Henry Marsh.
Harry H. Aiken.
INVENTOR.
Alverdo H. Mason
By R. E. Teschemacher
Atty

United States Patent Office.

ALVERDO H. MASON, OF BRAINTREE, MASSACHUSETTS.

EASEL FOR THE USE OF CHINA-DECORATORS.

SPECIFICATION forming part of Letters Patent No. 429,858, dated June 10, 1890.

Application filed March 6, 1890. Serial No. 342,904. (No model.)

*To all whom it may concern:*

Be it known that I, ALVERDO H. MASON, a citizen of the United States, residing at Braintree, in the county of Norfolk and State of Massachusetts, have invented an Improved Easel for the Use of China-Decorators, of which the following is a full, clear, and exact description, reference being had to the accompanying drawings, making part of this specification, in which—

Figure 1 is a perspective view of a china-decorator's easel constructed in accordance with my invention. Fig. 2 is a side elevation of the same, the parts being in the position which they occupy when holding a vase (shown in dotted lines) to be decorated. Fig. 3 is a plan of the easel, showing the parts in the position which they occupy when holding a plaque, (shown dotted,) the upper standard and parts connected therewith being removed. Fig. 4 is a side elevation of the same inclined at an angle. Fig. 5 is a vertical section on the line $x$ $x$ of Fig. 3. Fig. 6 is an enlarged vertical section through the upper jointed holding-frame. Fig. 7 is a detail in perspective of one of the radial sliding clamps enlarged. Fig. 8 is a side elevation of the upper jointed holding-frame with its arms or rods adjusted in a position different from that shown in Figs. 1, 2, and 6. Fig. 9 is a sectional detail of the hand-rest. Fig. 10 is a section on the line $y$ $y$ of Fig. 2, enlarged.

My invention relates to an improved easel for the use of china-decorators, by means of which a plaque, plate, cup, vase, pitcher, or other article of china or pottery ware can be firmly and conveniently held while being decorated, and can also be adjusted to any height or angle and readily turned or revolved with its support or holder to bring it into the most favorable light or position to enable any desired portion of its surface to be conveniently reached and operated upon by the hand of the artist.

To this end my invention consists in certain novel combinations of parts and details of construction, as hereinafter set forth, and specifically pointed out in the claims.

In the said drawings, A represents the frame or table of the easel, consisting of a central solid portion $b$, connected by radial arms $c$ with a circular rim $d$, preferably composed of thick wire. From a hub $e$ on the under side of the solid portion $b$ of the frame A projects a tubular spindle $f$, Fig. 5, which fits and is free to rotate within the tubular upper portion $g$ of a standard or spindle B, the lower portion $h$ of which slides through a clamp C, which is adapted to be secured to the edge of a table, shelf, or other surface by means of a thumb-screw $i$, as seen in Figs. 1, 2, and 4. The clamp C is provided with a pair of spring-jaws $k$, which embrace the spindle B and are adapted to be tightened thereupon by a thumb-screw $l$, by means of which the spindle can be securely held when revolved into any desired position or adjusted at any desired height. The lower end of the portion $g$ and the upper end of the portion $h$ are both enlarged to form flattened friction-surfaces, as shown, and these portions $g$ $h$ are pivoted together at the center to form a joint by a clamping-screw $m$, provided with a handle $n$, whereby the said friction-surfaces are drawn closely together to prevent the said portions from moving independently of each other, by which construction the swiveling frame or table A can be inclined or tilted, as seen in Fig. 4, at any desired angle to suit the convenience of the artist, and then clamped by means of the screw $m$.

To the upper end of the portion $g$ of the standard B is secured at its center a cross-bar D, to one end of which is removably secured a post or standard E, provided with a base-plate $p$, connected therewith and having on its under side a screw $q$, which passes down through an aperture in the bar D, below which it is provided with a thumb-nut $r$, by means of which the standard E is held firmly in place, said standard being prevented from turning axially by means of one or more pins, (seen dotted in Fig. 2,) which project from the under side of the plate $p$ and enter apertures $s$, Fig. 3, in the end of the bar D. The standard E, which is made tubular to insure lightness, is stiffened to prevent vibration by means of brace-rods $t$, rising from the plate $p$ and passing through a cross-head $u$ at the top of the standard, where they are secured by nuts $v$, as seen in Fig. 1.

Upon the standard E slides a horizontal arm G, provided with a clamping-screw $a'$, by means of which it may be held at any desired height when adjusted, and through an aperture at the outer end of this arm slides a downwardly-extending shaft $b'$, made adjustable by means of a set-screw 10, and carrying a jointed frame or spreader H, to be hereinafter described, which is adapted to be brought down upon or enter the top or mouth of a vase, pitcher, cup, or other hollow article of china or pottery ware placed upon the frame or table A of the easel, whereby it is held securely in place, as desired. When, however, a plaque, plate, or other article which does not require to be held at its upper end is to be decorated, the standard E, with its attachments, is removed from the easel, so as to be out of the way, it being simply necessary to remove the thumb-nut $r$, when the standard can be lifted off the bar D, the easel being shown with the standard thus removed in Figs. 3 and 4.

Each of the radial arms $c$, which extends nearly to the center of the frame A, is provided with a longitudinal slot $d'$, within which is fitted a sliding clamp I, provided with a thumb-screw $e'$, by means of which it can be firmly held in place after being adjusted within said slot at any desired distance from the center. Upon the outer curved side of each of the clamps I is secured a correspondingly-curved jaw $f'$, held in place by a set-screw $g'$, passing through a slot $h'$, within which also fits a steady-pin 15, Fig. 5, on the clamp I, whereby the jaw is prevented from turning around on the screw $g'$. At the upper end of the adjustable sliding jaw $f'$ is formed a hook or lip 12, which is adapted to fit over the edge or projecting portion of a plaque, plate, or other article to be decorated, as seen in Figs. 3 and 4, for the purpose of holding it immovably in place upon the frame or table A, when the set-screws $e'$ are tightened to hold the clamps I firmly in position after the latter have been moved up to the edge of the article to be held, and as each clamp I, with its jaw, is made independently adjustable it will be obvious that they can be readily moved into positions to hold a piece of china of circular, oval, rectangular, triangular, or other shape. By thus making the jaws $f'$ extensible in the direction of their length as far as permitted by their slots $h'$ the hooks or lips 12 may be made to fit over the edge of any article within the range of the vertical adjustment of the said jaws $f'$.

In many cases it is desirable to raise the article being decorated above the level of the frame or table A in order that its under surface may be rendered more accessible to the artist. To this end I have provided the frame or table A with a vertically-adjustable central portion or disk $i'$, which is mounted on a stem or spindle $k'$, sliding within the tubular spindle $f$, and adapted to be clamped when raised by means of a thumb-screw $l'$, as seen in Fig. 5, and in this manner the article to be decorated may be supported upon the disk $i'$ at the desired distance above the level of the frame or table A, the jaws $f'$ of the clamps I being correspondingly adjusted to enable their lips 12 to fit over the edge of said article, as seen in Fig. 4, when thus elevated into the desired position. The disk $i'$ is provided with notches $m'$ to permit the slotted radial arms $c$ to extend in as near to the center as possible in order to increase the range of motion of the clamps I within the slots $d'$, and on the under side of the disk $i'$ is a downwardly-extending pin $n'$, which extends through an aperture in the portion $b$ of the frame A into a position, as seen in Figs. 4 and 5, to enable it to be pressed upward by the finger when it is desired to raise the disk $i'$.

When a vase, pitcher, or other hollow article is to be decorated, which on account of its height cannot be firmly held in position by the clamps I alone, I employ the jointed holding-frame or spreader H, previously referred to, which is adjusted to bring it down upon the article to be held by sliding the shaft $b'$ through the horizontal arm G and clamping it by means of the set-screw 10, This frame H is composed of a series of rods or arms $p'$ $q'$. The rods $q'$ are pivoted at their lower ends between lugs $r'$, projecting from a short sleeve $s'$, which swivels or rotates upon the lower end of the shaft $b'$ between collars $t'$, which prevent it from sliding longitudinally upon the said shaft $b'$. The rods $p'$ are pivoted at their upper ends between lugs $u'$, projecting from a short sleeve $v'$, which rotates upon an inner sleeve $w'$, Fig. 6, which is free to rotate and slide longitudinally upon the shaft $b'$. The inner sleeve $w'$ is provided with collars $a^2$ $b^2$ immediately above and below the ends of the sleeve $v'$, by which the latter is kept in place upon the sleeve $w'$, but permitted to rotate freely thereon. Through the collar $a^2$ and sleeve $w'$ passes a set-screw $c^2$, by means of which the sleeve $w'$, with its sleeve $v'$, may be securely fastened in any position upon the shaft $b'$. The two rods $p'$ $q'$ of each pair are connected together at $d^2$ by a pivot forming a knee-joint, the end of the lower rod $q'$ being turned upward at an angle and being bifurcated to receive the end of the upper rod $p'$. With this construction, as the sleeves $v'$ $w'$ are moved upward or downward on the shaft $b'$, the rods $p'$ $q'$ will be moved inward or outward, thus varying the shape of the frame H, and by thus changing the angle of inclination of the lower rods $q'$ the said frame can be adapted to fit snugly upon or into a great variety of different-sized mouths or open upper ends of vases, cups, pitchers, or other hollow articles resting upon the frame or table A, the rods $p'$ $q'$ being securely held in the position in which they have been adjusted by tightening the set-screw $c^2$, and by pivoting said rods to sleeves swiveling upon the rod $b'$, as described, the frame H is free to rotate with the article being held when the latter is turned around with the swiveling frame or table A, upon which it is supported.

By sliding the movable sleeves $v'$ $w'$ down upon the shaft $b'$ until the rods $q'$ are carried below a horizontal plane, as seen in Fig. 8, which movement is permitted by the angular shape of the bifurcated ends of the rods $q'$, the shape of the frame may be changed, so that the joints $d^2$ will extend down within the article and rest on the bottom of the same, the frame when in this shape rendering the interior of the article accessible to the hand of the artist, which would not be the case if the frame was in the shape shown in Figs. 1, 2, and 6. The shape of the frame H can thus be varied to adapt it to fit into or upon an article of any size or diameter within the range of its adjustment for the purpose of holding it firmly and steadily while being decorated, and said frame H may be used with or without the clamps I, as in many cases the frame H will serve to firmly hold the article supported on the frame or table A without the employment of any other clamping or holding device whatever.

It is obvious that the rods or arms forming the frame H may be arranged and pivoted together in a manner somewhat different from that above described without departing from the spirit of my invention, and that the outer ends or portions which come into contact with the article to be held may be provided with soft pads to prevent the surface of the china or pottery ware from being scratched or marred.

In the end of the bar D opposite to that which carries the standard E is formed an aperture, through which slides a shaft $e^2$, made vertically adjustable by means of a set-screw $f^2$, Figs. 1 and 3, and to the upper end of this shaft $e^2$ is secured a square socket $g^2$, within which slides a tubular arm L, within which slides telescopically an arm $h^2$, to the inner end of which is secured a rest M for the hand of the decorator, this rest being preferably composed of wood. The tubular arm L slides freely through its socket $g^2$, and is held firmly therein when adjusted by a set-screw $i^2$; but the arm $h^2$ slides in the arm L with sufficient friction to hold it in place in whatever position it may have been adjusted by pushing it in and out with the hand. By this construction a limited range of motion is afforded to the rest M by sliding the arm L through the socket $g^2$; but by extending the arm $h^2$ by drawing it out of the tubular arm L the rest may be projected out to afford a rest for the hand over any desired portion of the plaque or other article on the easel, the movement of the rest in a horizontal plane being effected by loosening the set-screw $f^2$, when the supporting-arm of the rest can be swung around the axis of the rod $e^2$ as a center to the right or left, as may be desired, to bring the rest into the exact position desired. The vertical motion of the rest is produced by sliding the rod $e^2$ within the end of the bar D, so that the hand can be supported at the height desired. By thus constructing the supporting-arm for the rest so that one portion will slide telescopically within the other, as described, it may be made quite short, so as to be out of the way as much as possible, and yet be capable of being extended beyond the center, as desired, which advantage could not be secured if a single arm or bar of sufficient length to accomplish this result was employed; but, nevertheless, the rest M may be provided with a single supporting arm or bar, if preferred.

By constructing the main frame or table A with a solid central portion $b$, encircled by a rim $d$, connected therewith by radial arms, as shown, it will be seen that opportunity is afforded to pass the hand holding the brush from beneath up through the openings between the said rim and central portion if it should be found desirable to do so to conveniently reach any portion of the article being decorated.

When the easel is attached to the table or other surface and the thumb-screw $l$ of the clamp C has been loosened, the spindle B, with the bar D and frame or table A of the easel, can be raised to any desired height, and the bar D and parts connected therewith can then also be rotated in a horizontal plane around the axis of said spindle B to bring the hand-rest M and standard E in any desired position to suit the convenience of the artist, after which they can be clamped in such position by tightening the screw $l$. After the bar D has been adjusted in a horizontal plane to bring the hand-rest M and standard E into the desired position and the article to be decorated has been secured in place upon the frame or table A the latter can be rotated around the axis of its spindle $f$ as a center independently of the bar D, and then clamped immovably in place, if desired, by means of a thumb-screw $k^2$, Fig. 5, which passes through the upper end of the supporting standard or spindle B and bears against the spindle $f$ of the frame A. The entire easel can then be inclined or tilted at any angle desired by means of the joint in the standard B, before described, and clamped in such position by tightening the clamping-screw $m$. By means of this adjustment, together with the various adjustments of the other parts of the easel above described, articles of any shape or size within the limits of the easel can be firmly held and readily turned or moved to present them at any desired angle to the light, or to bring them into the most convenient positions to facilitate the work of the artist, whereby much inconvenience is avoided, as well as the necessity of holding or supporting the article with the hand while it is being decorated.

What I claim as my invention, and desire to secure by Letters Patent, is—

1. In an easel, the combination, with the main frame or table, of a series of holding-clamps adjustable radially toward and from the center of the table, said clamps being provided with independent sliding jaws vertically adjustable upon said clamps and having lips or hooks at their upper ends adapted to fit over the edge of the article to be held upon the frame or table, substantially as set forth.

2. In an easel, the combination, with an adjustable frame or table A, having an independently-movable central portion $i'$, adjustable vertically, as described, and adapted to support the article to be decorated above the level of said frame or table, of the radial sliding clamps I, provided with jaws $f'$, having hooks or lips at their upper ends and made adjustable vertically to fit over the edge of the article to be decorated when raised above the level of the frame or table, substantially as set forth.

3. In an easel, the combination, with the frame or table, of a standard located at one side of the same and provided with an adjustable arm or support carrying a frame adapted to fit into or upon the upper portion of the article to be decorated, said holding-frame being composed of rods or arms jointed together and made adjustable to vary the shape of said frame, whereby it is adapted to hold articles of different sizes and shapes, substantially as described.

4. In an easel, the combination, with the swiveling frame or table A, of a removable standard E, provided with an adjustable arm or support G, carrying a holding-frame adapted to fit into or upon the upper portion of the article to be decorated, the standard E being mounted on an independent support, whereby the frame A is adapted to rotate independently of said standard, substantially as set forth.

5. In an easel, the combination, with the main frame or table adapted to support the article to be decorated, of the holding-frame H, composed of a series of rods jointed together in pairs and pivoted at their upper and lower ends to sleeves swiveling upon a vertically-adjustable shaft, one of said sleeves being adapted to slide longitudinally upon the said vertical shaft, whereby the shape of the frame may be varied to adapt it to fit into or upon the article supported upon the main frame or table of the easel, substantially as set forth.

6. In an easel, the combination, with the swiveling frame or table A, of the hand-rest M, mounted on an arm supported in a socket or bearing and adapted to swing in a horizontal plane over said frame, said arm being mounted on a shaft made adjustable vertically in a support disconnected from the frame A, substantially as set forth.

7. In an easel, the combination, with the swiveling frame or table A, mounted upon a jointed standard, as described, of the adjustable hand-rest M and the removable standard E, with its adjustable arm G, carrying the adjustable jointed holding-frame H, said hand-rest and standard being secured to a bar or support D, located beneath the frame or table A and disconnected therefrom, whereby said frame or table is free to rotate independently of said hand-rest and standard, substantially as set forth.

8. In an easel, the combination of the frame or table A, adapted to rotate upon the jointed standard B, the latter being provided with a clamp C for attachment to a table or shelf, the bar D, secured to the upper end of the standard B beneath the frame or table A, the hand-rest M, with its supporting-arm adjustable within a socket or bearing at the upper end of the shaft $e^2$, vertically adjustable within the end of the bar D, the standard E, the arm G, adjustable vertically thereon and carrying at its outer end the vertically-adjustable shaft $b'$, and the jointed holding-frame H, adjustable upon said shaft $b'$, all operating substantially in the manner and for the purpose set forth.

9. In an easel, the frame or table A, having a solid central portion and an outer rim connected therewith by radial arms, whereby spaces or openings are left between said rim and central portion for the passage of the hand from beneath, substantially as set forth.

Witness my hand this 27th day of February, A D. 1890.

ALVERDO H. MASON.

In presence of—
P. E. TESCHEMACHER,
HARRY W. AIKEN.